(12) United States Patent
Bae et al.

(10) Patent No.: US 10,754,522 B2
(45) Date of Patent: Aug. 25, 2020

(54) APPARATUS FOR EDITING OBJECTS

(71) Applicant: LSIS CO., LTD., Gyeonggi-do (KR)

(72) Inventors: Ae-Kyoung Bae, Gyeonggi-do (KR);
Yeo-Chang Yoon, Gyeonggi-do (KR);
Seung-Ju Lee, Gyeonggi-do (KR);
Seok-Chan Lee, Gyeonggi-do (KR);
Jang-Hyeok Yun, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 254 days.

(21) Appl. No.: 15/606,397

(22) Filed: May 26, 2017

(65) Prior Publication Data
US 2018/0136827 A1    May 17, 2018

(30) Foreign Application Priority Data

Nov. 14, 2016   (KR) .......................... 10-2016-0151378

(51) Int. Cl.
| | | |
|---|---|---|
| G06F 3/048 | (2013.01) | |
| G06F 3/0484 | (2013.01) | |
| G06F 3/0481 | (2013.01) | |
| G06F 3/0482 | (2013.01) | |

(52) U.S. Cl.
CPC ........ G06F 3/04845 (2013.01); G06F 3/0482 (2013.01); G06F 3/04817 (2013.01); G06F 3/04847 (2013.01)

(58) Field of Classification Search
None
See application file for complete search history.

(56) References Cited

U.S. PATENT DOCUMENTS

| | | | | |
|---|---|---|---|---|
| 8,937,620 B1* | 1/2015 | Teller | ...................... | G06T 13/80 |
| | | | | 345/467 |
| 2003/0174174 A1* | 9/2003 | Fitzpatrick | ............ | G06F 3/0482 |
| | | | | 715/809 |
| 2005/0071306 A1* | 3/2005 | Kruszewski | ............ | G06T 13/40 |
| | | | | 706/47 |

(Continued)

FOREIGN PATENT DOCUMENTS

| | | | |
|---|---|---|---|
| JP | H11-25285 A | 1/1999 | |
| JP | 3835589 B2 | 10/2006 | |

(Continued)

OTHER PUBLICATIONS

European Search Report for related European Application No. 17172454.5; report dated Nov. 13, 2017; (8 pages).

Primary Examiner — Hua Lu
(74) Attorney, Agent, or Firm — K&L Gates LLP

(57) ABSTRACT

Disclosed herein is an apparatus for editing objects that applies some of object attributes of one or more objects to a target object as selected attributes. The apparatus for editing object attributes of an HMI object in a power system includes: a display unit configured to display one or more objects; an input unit configured to receive a selected object among one or more objects and receive from a user a selected attribute to be copied among object attributes of the selected object and a target object to which the selected attribute is to be applied; and a control unit configured to control the display unit so that the selected attribute is applied to the target object and the target object with the selected attribute applied thereto is displayed.

9 Claims, 12 Drawing Sheets

(56) References Cited

U.S. PATENT DOCUMENTS

| | | | | |
|---|---|---|---|---|
| 2005/0107998 | A1* | 5/2005 | McLernon | G06F 8/34 703/22 |
| 2005/0276519 | A1* | 12/2005 | Kitora | H04N 1/00411 382/305 |
| 2006/0277377 | A1* | 12/2006 | Le | H04M 1/0254 711/162 |
| 2007/0162906 | A1* | 7/2007 | Chandhoke | G06F 9/485 718/100 |
| 2008/0115046 | A1* | 5/2008 | Yamaguchi | G06F 40/166 715/201 |
| 2008/0189638 | A1* | 8/2008 | Mody | G05B 19/0426 715/771 |
| 2009/0077498 | A1* | 3/2009 | Shima | G06F 40/14 715/823 |
| 2010/0082814 | A1* | 4/2010 | Plache | H04L 67/322 709/226 |
| 2010/0083232 | A1* | 4/2010 | Chouinard | G06F 21/10 717/124 |
| 2010/0235767 | A1* | 9/2010 | Hammack | G06T 3/0012 715/763 |
| 2010/0275139 | A1* | 10/2010 | Hammack | G05B 19/0426 715/763 |
| 2012/0030570 | A1* | 2/2012 | Migos | G06F 3/04883 715/702 |
| 2013/0132146 | A1* | 5/2013 | Pye | G06Q 10/06 705/7.22 |
| 2015/0019489 | A1* | 1/2015 | Kritt | G06F 40/103 707/634 |
| 2015/0277404 | A1* | 10/2015 | Maturana | G05B 15/02 700/83 |
| 2016/0132048 | A1* | 5/2016 | Kambe | G05B 19/41845 700/87 |
| 2016/0282859 | A1* | 9/2016 | Wilber | G05B 19/41875 |
| 2016/0368435 | A1* | 12/2016 | Mullen | H04L 69/04 |
| 2017/0277675 | A1* | 9/2017 | Hirata | G06F 40/103 |
| 2018/0011779 | A1* | 1/2018 | Anifa | G06F 11/3672 |
| 2018/0095651 | A1* | 4/2018 | Manske | G06F 3/04842 |

FOREIGN PATENT DOCUMENTS

| | | |
|---|---|---|
| JP | 2009-157580 A | 7/2009 |
| JP | 4322780 B2 | 9/2009 |
| JP | 4463716 B2 | 5/2010 |
| JP | 4970105 B2 | 7/2012 |

* cited by examiner

FIG. 9

| LIST OF ATTRIBUTES |
|---|
| ☐ RECTANGLE/SHADING/ARIAL |
| ☑ TRIANGLE/BLINKING/8pt |
| ☐ CIRCLE/EVENT/GOTHIC |
| ⋮ |

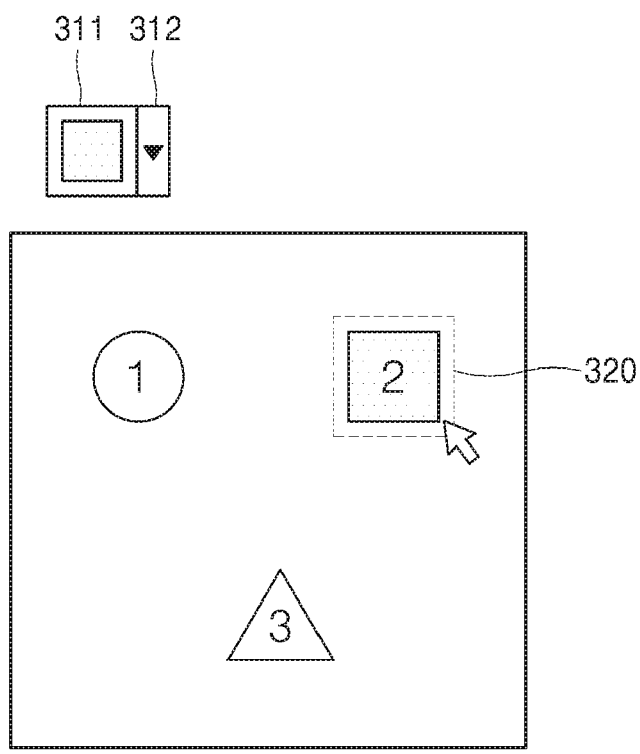

APPARATUS FOR EDITING OBJECTS

CROSS-REFERENCE TO RELATED APPLICATIONS

This application claims the benefit of Korean Patent Application No. 10-2016-0151378, filed on Nov. 14, 2016, entitled "APPARATUS FOR EDITING OBJECT", which is hereby incorporated by reference in its entirety into this application.

BACKGROUND

1. Technical Field

The present disclosure relates to an apparatus for editing objects, and more specifically to an apparatus for editing objects that applies some of object attributes of one or more objects to a target object as selected attributes.

2. Description of the Related Art

A supervisory control and data acquisition (SCADA) power system is a large-scale power system that processes and monitors a large volume of data and provides a variety of functions associated therewith. In particular, such a SCADA power system is frequently employed for controlling a large-scale process, and an HMI is used to intuitively identify and manage data associated with the process.

Such HMI is typically connected to the software and database of the SCADA power system and provides analysis functions using various data generated from the process. To this end, the HMI displays the data associated with the process on the screen in the form of human-recognizable objects, and the user can analyze and manage the process using the objects.

More specifically, each of the objects used in the HMI corresponds to the respective data related to the process, and the objects have inherent attributes according to their roles and functions. The user can determine a process with which an object is associated, based on the attributes of the object.

As the industry grows and the complexity of the process increases, the attributes of the objects used in the HMI are refined more and more. Accordingly, there is an increasing demand for an apparatus for editing objects that allows users to selectively edit attributes of an object and to display the edited object on the screen in order to manage the overall processing system with the object.

FIG. 1 is a diagram for illustrating an editing process by an existing apparatus for editing objects. Referring to FIG. 1, in the existing apparatus, a user drags around a single object so that it is included in an area 20, and then copies all of the attributes of the single object by clicking the mouse on a copy icon 10. Then, the user drags around an object to which she or he wants to apply the copied attributes so that it is included in an area 20, and then clicks the mouse on the copy icon 10 to thereby display an object 30' to which the copied attributes are applied.

However, the existing apparatus for editing objects allows a user to copy all of the attributes of an object only, it is not possible to specify a certain attribute the user wants to apply to another object. In addition, the existing apparatus does not display a list of attributes already applied, and thus it is not possible to manage the edited objects integrally. Accordingly, a user has to repeat a series of operations depicted in FIG. 1 whenever she or he edits objects. Further, the existing apparatus does not graphically displays the copy icon with a copied attribute, and thus it is not possible to intuitively recognize the copied attribute.

SUMMARY

It is an object of the present disclosure to provide an apparatus for editing objects capable of specifying attributes to be applied to a target object by inputting some of object attributes of one or more objects as selected attributes.

It is an object of the present disclosure to provide an apparatus for editing objects capable of efficiently applying selected attributes of a plurality of objects by setting priority based on the functionality and purpose of processes corresponding to the respective objects.

It is another object of the present disclosure to provide an apparatus for editing objects capable of efficiently applying selected attributes of a plurality of objects by setting priority based on the functionality and purpose of processes corresponding to the respective objects.

It is another object of the present disclosure to provide an apparatus for editing objects capable of managing edited objects integrally and simply editing the objects by displaying a list of attributes representing selected attributes already applied to receive selected attributes via the displayed list.

It is another object of the present disclosure to provide an apparatus for editing graphic objects capable of graphically displaying a list of attributes and a copy icon according to selected attributes so that a user can intuitively recognize selected attributes to be applied.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for editing object attributes of an HMI object in a power system includes: a display unit configured to display one or more objects; an input unit configured to receive from a user a selected attribute to be copied among object attributes of one or more objects and a target object to which the selected attribute is to be applied; and a control unit configured to control the display unit so that the selected attribute is applied to the target object and the target object with the selected attribute applied thereto is displayed.

According to an exemplary embodiment of the present disclosure, attributes to be applied to a target object can be specified by inputting some of object attributes of one or more objects as selected attributes.

According to an exemplary embodiment of the present disclosure, selected attributes of a plurality of objects can be efficiently applied by setting priority based on the functionality and purpose of processes corresponding to the respective objects.

According to an exemplary embodiment of the present disclosure, selected attributes of the same kind can be efficiently applied by setting an application sequence of object attributes based on the functionality and purpose of processes corresponding to the respective objects.

According to an exemplary embodiment of the present disclosure, edited objects can be managed integrally and the objects can be simply edited by displaying a list of attributes representing selected attributes already applied to receive selected attributes via the displayed list.

According to an exemplary embodiment of the present disclosure, a list of attributes and a copy icon are graphically displayed according to selected attributes so that a user can intuitively recognize selected attributes to be applied.

BRIEF DESCRIPTION OF DRAWINGS

FIG. 9 is a diagram showing a list of attributes according to an exemplary embodiment of the present disclosure;

FIGS. 11 and 12 are diagrams showing the copy icon displayed according to selection attributes according to an exemplary embodiment of the present disclosure.

DETAILED DESCRIPTION

Figure 1:
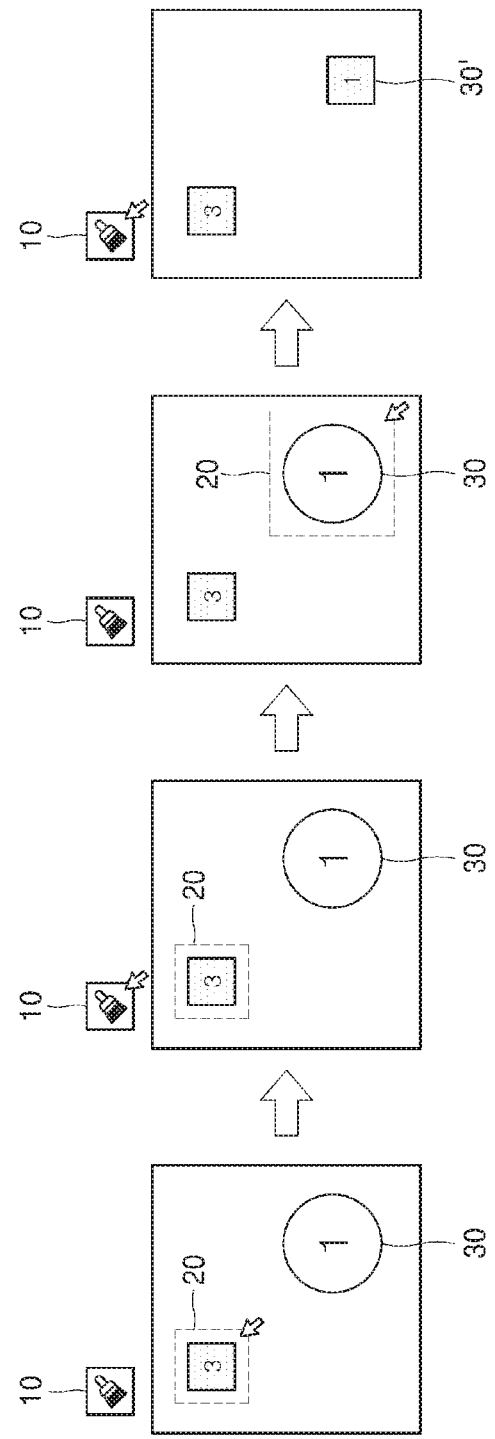
FIG. 1 is a diagram for illustrating an editing process by an existing apparatus for editing objects.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
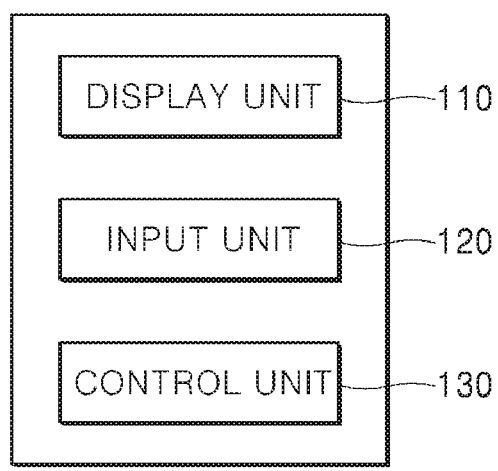
FIG. 2 is a diagram for illustrating an apparatus for editing objects 100 according to an exemplary embodiment of the present disclosure.

FIG. 2 is a diagram for illustrating an apparatus for editing objects 100 according to an exemplary embodiment of the present disclosure. Referring to FIG. 2, the apparatus for editing objects 100 may include a display unit 110, an input unit 120, and a control unit 130. The apparatus 100 shown in FIG. 2 is merely an exemplary embodiment of the present disclosure, and the elements are not limited to those shown in FIG. 2. Some elements may be added, modified or eliminated as desired.

The display unit 110 according to according to the exemplary embodiment of the present disclosure may display one or more objects. As used herein, an object may be data that has one or more attributes and is displayed in a particular shape.

An HMI used in a supervisory control and data acquisition (SCADA) power system that controls a large-scale process is typically connected to the software and database of the SCADA power system.

Such an HMI may provide analysis capability using various data generated in the process. To this end, the HMI may display, on the screen, data associated with the process, for example, the plant's facility or the specific value indicated by the facility in the form of objects that can be recognized by human. The user can analyze and control the process associated with the objects by using the attributes of the objects.

Also, the user may edit the attributes of the objects according to the purpose or functionality of the process corresponding to each of the objects, and may edit the connection relationship among the objects according to the sequence and procedure of the process. Thus, each of the objects corresponding to the respective processes may have a unique attribute distinguished from that of other objects, which is referred to as an object attribute.

The user can efficiently control the processes by sorting the object attributes based on a certain criterion. In addition, different users using the same HMI software can determine the purpose, the functionality, or the sequence of each process from the object attributes.

More specifically, the object attributes may include at least one of a form attribute, a type attribute, a dynamic attribute, and a character attribute. The term attribute may include information on the shape of an object. For example, the form attribute may include information on whether the shape of the object is a rectangle, a triangle, a circle, or the like. The form attribute may also include information on whether an object is shaded or which color an object has. These form attributes may include any shape supported by the software that creates the object.

The type attribute may contain information on the functionality of an object. For example, the type attribute may include information on whether an object triggers a predetermined event when it is selected. In addition, the type attribute may include information on whether it is a button that the connection relationship between objects is controlled when it is selected. In addition, the type attribute may also include information on whether an object has an OLE Control Extension (OCX).

The dynamic attribute may include information on the motion of an object displayed in the display unit 110. For example, the dynamic attribute may include information on whether an object is selectively displayed (appearance) according to a specific condition, information on whether the object is moving. The dynamic attribute may also include information on whether an object is rotating, increasing, decreasing, or blinking at certain intervals (Blink).

The character attribute may include information on characters included in the name of an object. For example, the character attributes may include information such as a font (times roman, arial, gothic, etc.), a size (8 pt, 10 pt, 12 pt, etc.) or a style (italic, bold, etc.) of the name of an object.

According to an exemplary embodiment of the present disclosure, the input unit 120 may receive a selected object from among one or more objects displayed on the display unit 110. In addition, the input unit 120 may receive from the user a selected attribute the user wants to copy from among the object attributes of the selected object. Although not shown in the drawings, the input unit 120 may include a copy unit for copying a selected attribute and a selection unit for selecting a target object, in order to perform the above-described operations described.

As used herein, a selected object includes a selected attribute a user wants to copy to a target object to be described below. More than one selected objects may be chosen. A selected attribute refers to an attribute that the user wants to copy among the object attributes of the selected object. More specifically, the selected attribute may include at least one of a form attribute, a dynamic attribute, a type attribute, and a character attribute included in object attributes, as described above.

Figure 3:
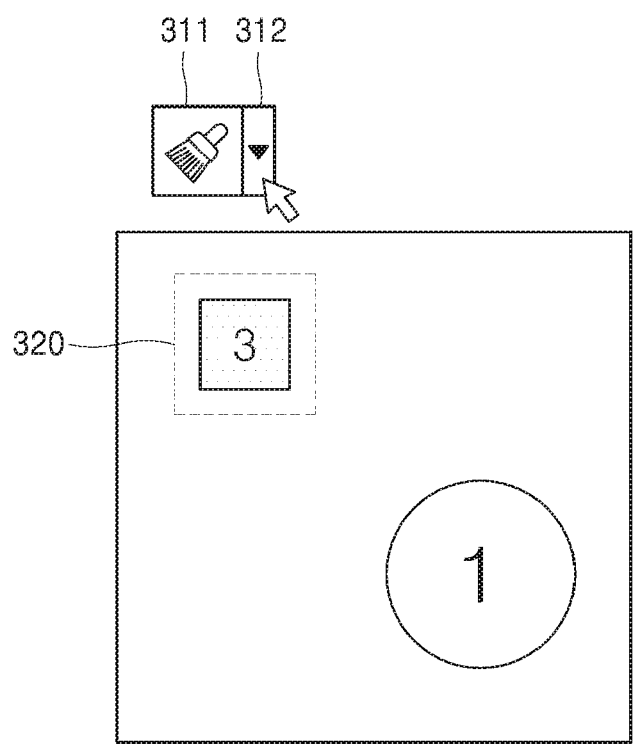
FIG. 3 is a diagram for illustrating an operation of clicking a mouse on an arrow of drop-down list to copy an object attribute of a single object according to an exemplary embodiment of the present disclosure.
Figure 4:
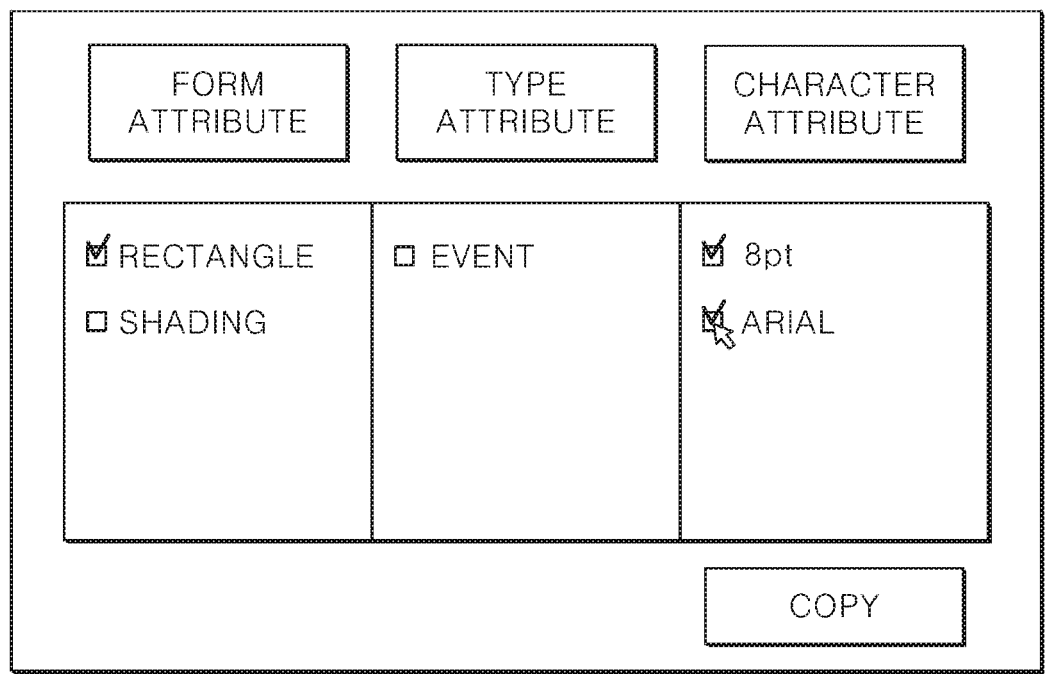
FIG. 4 is a diagram for illustrating a window for entering selected attributes of a single object according to an exemplary embodiment of the present disclosure.

FIG. 3 is a diagram for illustrating an operation of clicking a mouse on an arrow of drop-down list 312 to copy an object attribute of a single object according to an exemplary embodiment of the present disclosure. FIG. 4 is a diagram for illustrating an input window for entering selected attributes of a single object according to an exemplary embodiment of the present disclosure. Hereinafter, an example in which the input unit 120 according to an exemplary embodiment of the present disclosure receives object attributes of a single object will be described in detail with reference to FIGS. 3 and 4.

The input unit 120 may receive a selected object, a selected attribute, and a target object from a user via an input device. The input device includes any input device supported by an operating system in which object editing software is installed, such as a mouse, a keyboard, and a part of a user's body in contact with a touchpad.

Referring to FIG. 3, an object #1, an object #3, a copy icon 311, and an arrow of drop-down list 312 may be displayed on the display unit 110. The input device may be a mouse. It is to be noted that the apparatus according to the exemplary embodiment of the present disclosure may further include the arrow of drop-down list 312 in addition to the copy icon 311. As will be described below, the user may click the mouse on the arrow of drop-down list 312 to enter a selected attribute.

The object attributes of the object #3 may include a form attribute of a rectangle and shading, a type attribute including an event, and a character attribute of an 8 pt and Arial font. If the user wants to copy some of the object attributes included in the object #3, the user may drag around the object #3 so that it is included in an area 320 to enter the selected object.

Alternatively, if the user wants only one selected object, the user may enter the selected object by clicking the mouse on the object. For example, in FIG. 3, if there is an attribute that the user wants to copy among the object attributes included in the object #3, the user may enter the selected object by clicking the mouse on the object #3.

Then, the user may click the mouse on the arrow of drop-down list 312 to enter the selected attributes. More specifically, when the user clicks the mouse on the arrow of drop-down list 312, a window for entering selected attributes as shown in FIG. 4 may be displayed on the display unit 110.

The window for entering selected attributes may be in the form of check boxes. In the window, the object attributes of the object #3 (selected object) in FIG. 3 may be displayed by being sorted into a form attribute, a type attribute and a character attribute. More specifically, the object #3 may include the form attribute of a rectangle and shading, the type attribute that triggers an event when the object is selected, and the character attribute of 8 pt and Arial font.

The user may check a check box for rectangle in the form attribute, no check box in the type attribute, and a check box for 8 pt and a check box for Arial in the character attribute. After checking the check box, the user may click the mouse on a copy button at the lower portion of the window to finish entering the selected attributes. In this manner, the user can specify the attributes to be copied by combining only some of object attributes of a single object and entering them as selected attributes.

Once the selected attributes are input as described above, the copy unit may copy the input selected attributes and store them in a memory such as a RAM.

Figure 5:
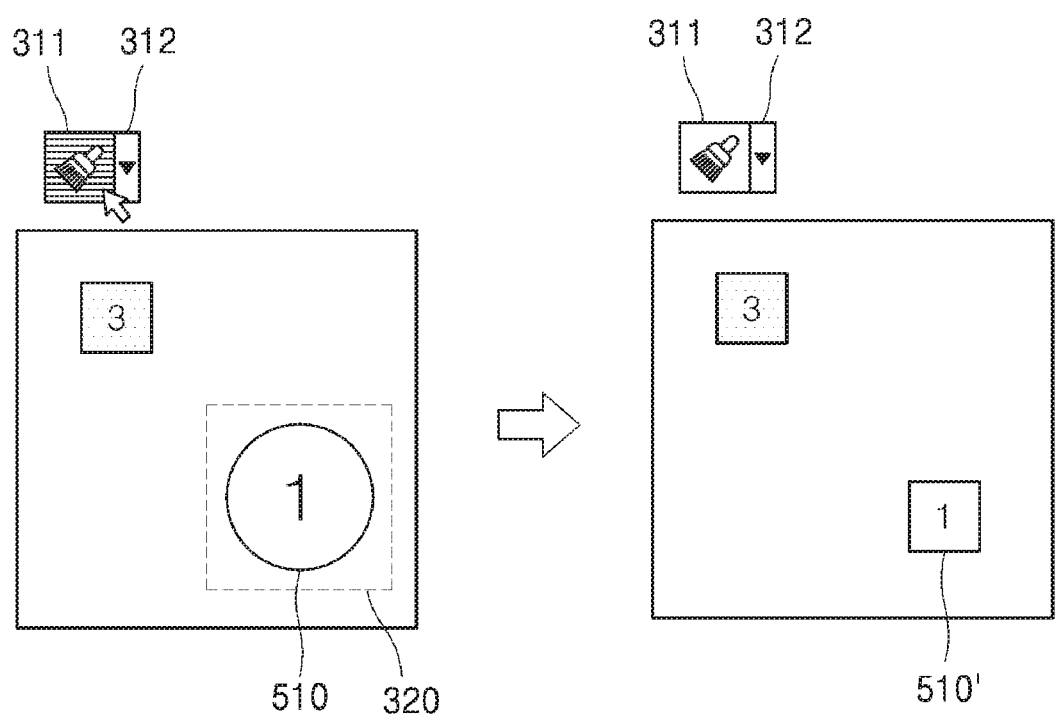
FIG. 5 is a diagram for illustrating an operation of applying selected attributes to a target object according to an exemplary embodiment of the present disclosure.

FIG. 5 is a diagram for illustrating an operation of applying selected attributes to a target object 510 according to an exemplary embodiment of the present disclosure. Hereinafter, an example of applying selected attributes to the target object 510 will be described with reference to FIG. 5.

The input unit 120 according to an exemplary embodiment of the present disclosure may receive from a user the target object 510 to which selected attributes are to be applied. When the target object is entered from the user, the selection unit can specify and select the target object.

The target object 510 refers to an object to which the selected attributes are to be applied. When the selected attributes are applied to the target object 510, some of the object attributes of the target object 510 corresponding to the selected attributes may be replaced with the selected attribute. For example, if selected attributes including the form attribute of a rectangle are applied to a target object that includes the form attribute of a circle, the form attribute of the circle may be replaced with the form attribute of the rectangle.

According to an exemplary embodiment of the present disclosure, the control unit 130 may control the display unit 110 so that the selected attributes input from the user are applied to the target object 510 and the target object 510 to which the selected attributes are applied is displayed.

Referring to FIG. 5, the control unit 130 may process the copy icon 311 so that it is shaded when the selected attributes are input by the input unit 120. As the copy icon 311 is shaded, the user can graphically recognize that the selected attributes have been input. The user can input the target object 510 by dragging around the target object 510 so that it is included in the area 320. Then, when the user clicks the mouse on the copy icon 311, the control unit 130 may apply the selected attributes to the target object 510.

The control unit 130 may control the display unit 110 so that the target object 510' to which the selected attributes inputted in FIG. 4 have been applied is displayed. Accordingly, the form attribute and the character attribute of the target object 510' can be replaced with the form attribute of a rectangle and the character font of 8 pt and Arial font.

Figure 6:
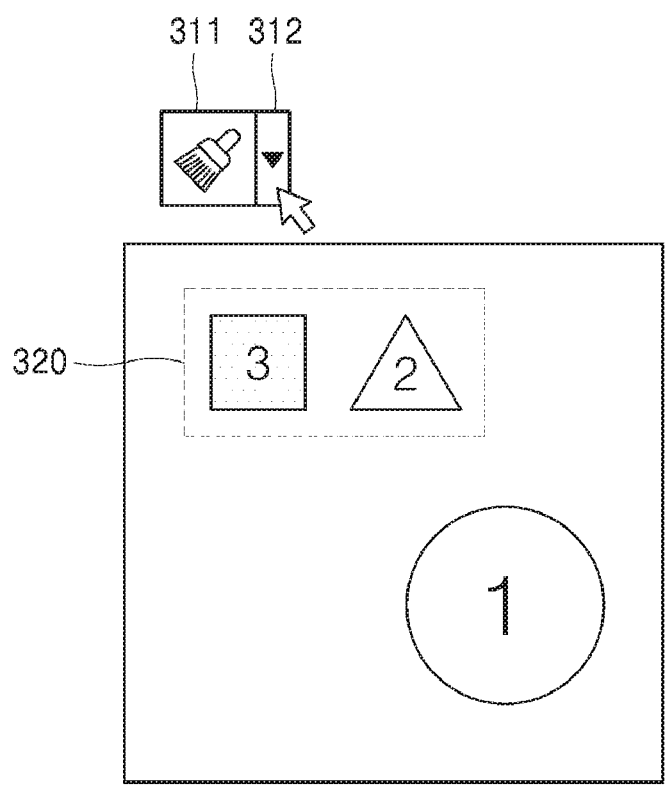
FIG. 6 is a diagram for illustrating an operation of clicking a mouse on an arrow of drop-down list to copy object attributes of a plurality of objects according to an exemplary embodiment of the present disclosure.
Figure 7:
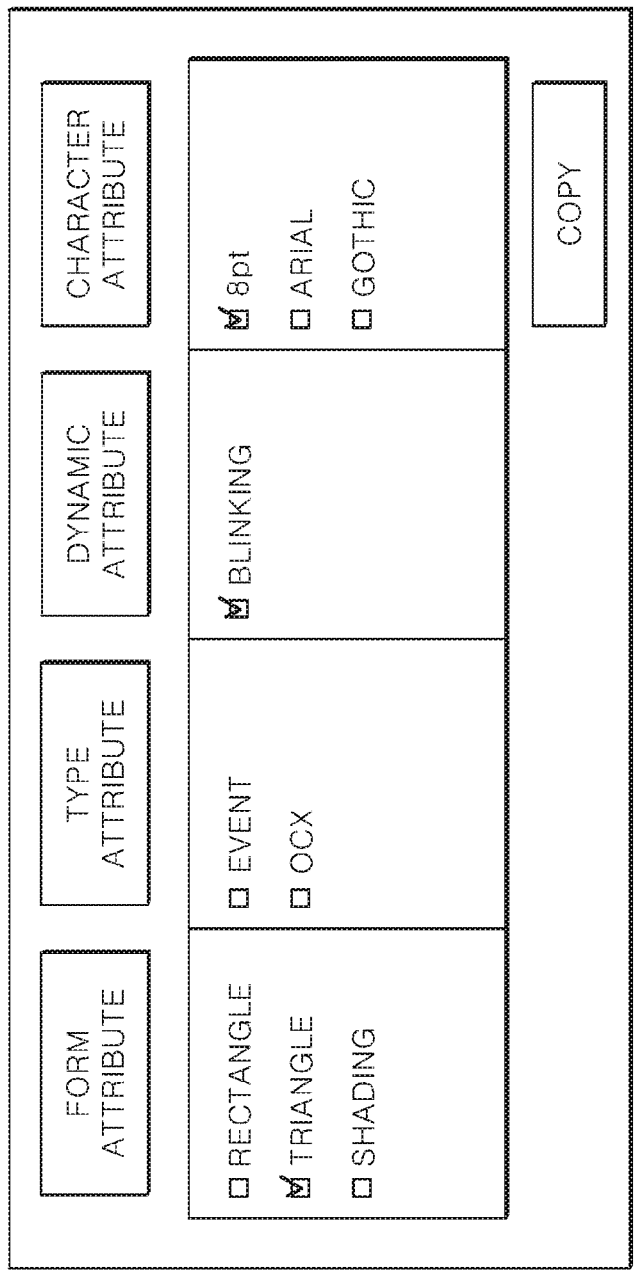
FIG. 7 is a diagram for illustrating a window for entering selected attributes of a plurality of objects according to an exemplary embodiment of the present disclosure.

FIG. 6 is a diagram for illustrating an operation of clicking a mouse on an arrow of drop-down list 312 to copy object attributes of a plurality of objects according to an exemplary embodiment of the present disclosure. FIG. 7 is a diagram for illustrating a window for entering selected attributes of a plurality of objects according to an exemplary embodiment of the present disclosure. Hereinafter, an example in which the input unit 120 according to an exemplary embodiment of the present disclosure receives object attributes of a plurality of objects will be described in detail with reference to FIGS. 6 and 7.

Referring to FIG. 6, if the user wants to copy some of the object attributes included in an object #2 and an object #3, the user may drag around the object #2 and object #3 so that they are included in an area 320 to enter the selected objects.

Then, the user may click the mouse on the arrow of drop-down list 312 to enter the selected attributes. More specifically, when the user clicks the mouse on the arrow of drop-down list 312, a window for entering selected attributes as shown in FIG. 7 may be displayed on the display unit 110.

The window for entering selected attributes may be configured in the form of check boxes as shown in FIG. 4. More specifically, in the window, the object attributes of the object #2 and the object #3 (selected objects) in FIG. 6 may be displayed by being sorted into a form attribute, a type attribute and a character attribute.

For example, the object #3 may include the form attribute of a rectangle and shading, the type attribute that triggers an event when the object is selected, and the character attribute of 8 pt and Arial font, like the object #3 shown in FIG. 3. On the other hand, the object #2 may include the form attribute of a triangle, the type attribute that the object has a user defining control functionality, the dynamic attribute of blinking at a regular interval, and the character attribute of 8 pt and Gothic font. The window for entering selected attributes may display all of the object attributes of the objects #2 and #3 by sorting them.

The user may check a check box for a triangle in the form attribute, and no check box in the type attribute. In addition, the user may check a check box for blinking in the dynamic attribute, and a check box for 8 pt in the character attribute. After checking the check box, the user may click the mouse on a copy button at the lower portion of the window to finish entering the selected attributes.

In this manner, the user can diversify the attributes to be copied by combining only some of object attributes of a plurality of objects and entering them as selected attributes. The process of applying the selected attributes to the target object 510 is equal to that of FIG. 5; and, therefore, the detailed description will be omitted.

Figure 8:
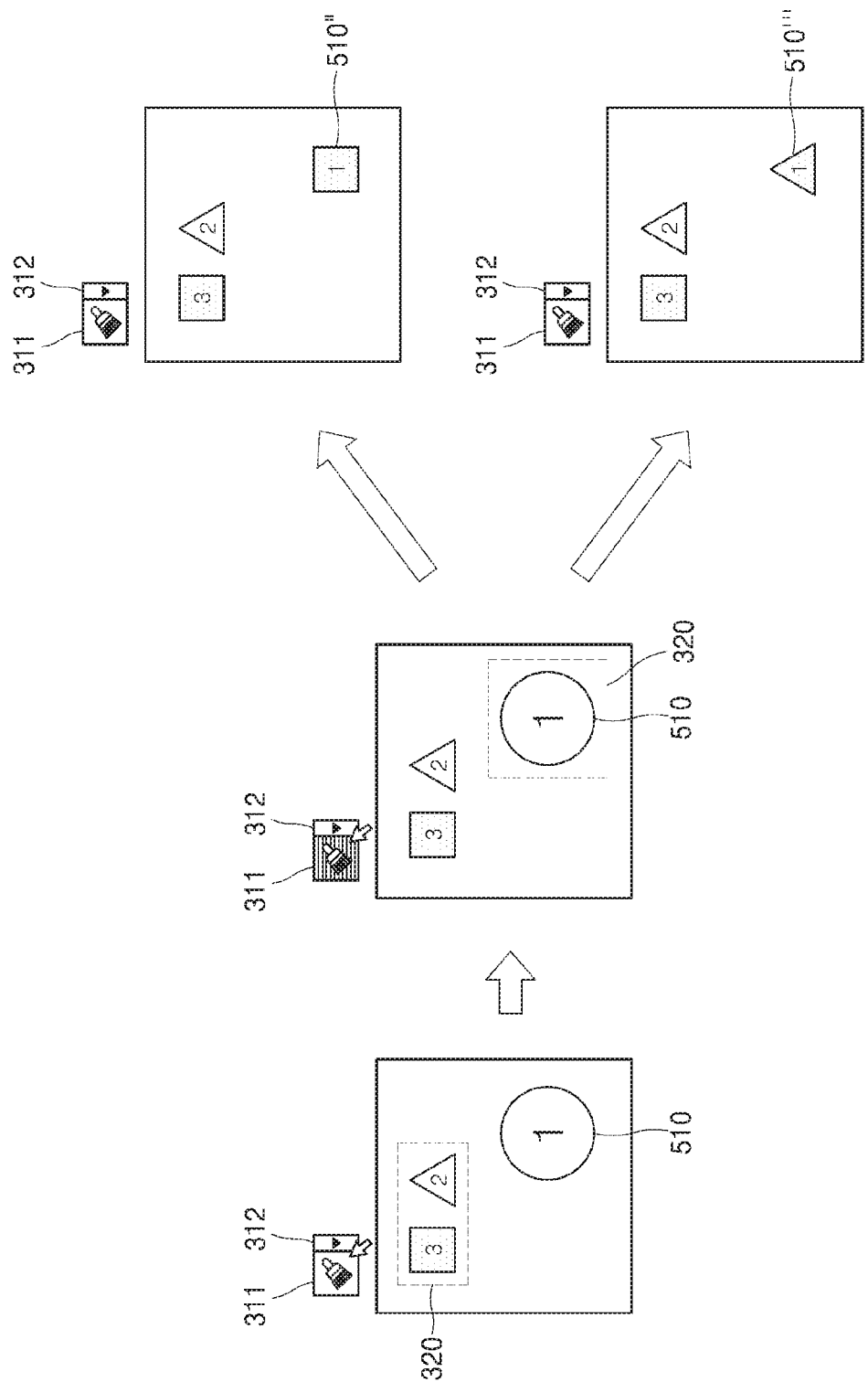
FIG. 8 is a diagram for illustrating an operation of applying selected attributes of a plurality of objects to the target object according to the priority or application sequence according to an exemplary embodiment of the present disclosure.

FIG. 8 is a diagram for illustrating an operation of applying selected attributes of a plurality of objects to the target object 510 according to the priority or application sequence according to an exemplary embodiment of the present disclosure. Hereinafter, an example in which selected attributes of a plurality of objects are applied to the target object 510 according to the priority will be described with reference to FIG. 8.

According to an exemplary embodiment of the present disclosure, when a user enters selected attributes of a plurality of objects, the control unit 130 may apply the selected attributes to the target object 510 according to a predetermined priority. The predetermined priority may be a predetermined criterion that determines the selected attributes of which one of the objects is applied to the target object 510 first when a plurality of objects is selected. For example, the priority may be set according to the functionality and purpose of the process corresponding to each object.

Referring to FIG. 8, the user may enter the selected objects by dragging around the second object #2 and the third object #3 so that they are included in the area 320, and then click the mouse on the copy icon 311. The copy icon 311 may be an icon for copying all the object attributes of the selected objects included in the area 320.

In other words, when the user clicks the mouse on the copy icon 311, all of the object attributes of the selected objects included in the area 320 may become selected attributes. Then, the user drags around the target object 510 so that it is included in the area 320 and then clicks the mouse again on the copy icon 311, such that the control unit 130 may apply the selected attribute to the target object 510.

At this time, according to the predetermined priority, the object #3 may have a higher priority than the object #2. Accordingly, the control unit 130 may apply only the object attributes of the object #3 among the selected objects #2 and #3 to the target object 510. In other words, the object attributes of the target object 510" to which the selected attributes are applied may include the form attribute of the rectangle and the shading which is the object attributes of the object #3. The predetermined priority may be set according to the user's necessity.

According to an exemplary embodiment of the present disclosure, the control unit 130 may apply selected attributes to the target object 510 according to a predetermined application sequence. The predetermined application sequence may be a predetermined criterion that determines which one of the selected attributes is applied to the target object 510 first when the same kind of the selected objects are entered. The application sequence may be set according to the functionality and purpose of the process corresponding to each object.

The same kind of selected attributes refer to the same kind of attributes each of the objects has when selected attributes of a plurality of objects are entered. For example, if a user enters selected attributes of two objects, the selected attributes of the object #1 may include a form attribute of yellow. On the other hand, the selected attributes of the second object may include a form attribute of blue. In this example, the form attributes are the same kind of selected attributes.

Referring to FIG. 8, the user may enter the selected objects by dragging around the second object #2 and the third object #3 so that they are included in the area 320, and then click the mouse on the copy icon 311. As described above, when the user clicks the mouse on the copy icon 311, all of the object attributes of the selected objects included in the area 320 may become selected attributes. Then, when the user drags around the target object 510 so that it is included in the area 320 and then clicks the mouse on the copy icon 311, the control unit 130 may apply the selected attributes to the target object 510.

According to the predetermined application sequence of the form attributes, the triangle may have a higher priority than the rectangle. In addition, according to the predetermined application sequence of the form attributes, the shading may have the highest application sequence. In other words, if there is a shaded object in the area 320, the form attribute of shading may be applied to the target object 510 first.

Accordingly, the control unit 130 may first apply the form attribute of shading among the object attributes of the selected objects #2 and #3 to the target object 510, and may apply the form attribute of the triangle having the higher application sequence than the rectangle to the target object 510. That is, the object attribute of the target object 510''' to which the selected attribute is applied may include the form attribute of the triangle of the second object and the form attribute of the shading of the object #3. The predetermined application sequence may be set according to the user's necessity.

According to the exemplary embodiment of the present disclosure, by setting the priority of the object and the application sequence of the object attributes as described above, a selected attribute can be efficiently applied to a plurality of objects.

The above-described method for applying an object attribute to a target object 510 is carried out by copying the selected attribute and selecting the target object 510 and then clicking the mouse on the copy icon 311. However, it is to be understood that the selected attribute may also be applied to the target object by copying the selected attribute, clicking the mouse on the copy icon 311 and then selecting the target object 510.

In other words, the control unit 130 may apply the copied selected attribute to the target object 510 when the target object 510 is selected by the selection unit. More specifically, as described above, the user may enter a selected attribute via a check box, may click the mouse on an object to enter a selected attribute, or may drag around an object so that it is included in an area to enter a selected attribute. When the selected attribute is input, the copy unit may copy the input selected attribute.

The user may click the mouse on the copy icon 311 to select a target object. The target object 510 may be selected by clicking or dragging, as described above. As soon as the target object 510 is selected by clicking the mouse on the copy icon 311, a selected attribute may be applied to the target object 510.

On the other hand, when the selection of the target object 510 is released, the control unit 130 may cancel the copy of the selected attribute. More specifically, when the user releases the selection of the target object 510, the copy unit may cancel the copy of the selection attributes.

For example, when the user dragging around the target object 510 so that it is included in an area to select it, the selection of the target object 510 can be released by clicking on any point outside the area. When the selection of the target object 510 is released, the copy unit may cancel the copy of the selected attribute. More specifically, when the selection of the target object 510 is released, the copy unit deletes the selected attributes temporarily stored in a memory to cancel the copy of the selected attributes.

Figure 10:
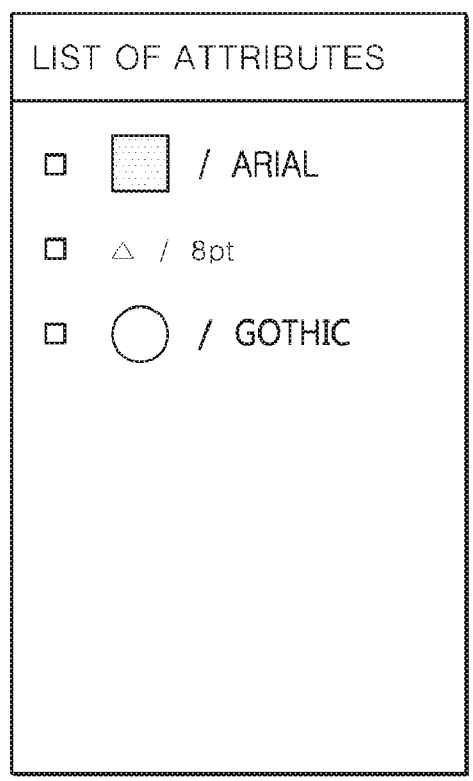
FIG. 10 is a diagram showing a list of attributes displayed according to selected attributes according to an exemplary embodiment of the present disclosure.

FIG. 9 is a diagram showing a list of attributes according to an exemplary embodiment of the present disclosure. FIG. 10 is a diagram showing a list of attributes displayed according to selected attributes according to an exemplary embodiment of the present disclosure. Hereinafter, a list of attributes according to an exemplary embodiment of the present disclosure will be described in detail with reference to FIGS. 9 and 10.

According to an exemplary embodiment of the present disclosure, the control unit 130 may control the display unit 110 so that it further displays a list of attributes that represents selected attributes applied to the target object 510. In addition, according to an exemplary embodiment of the present disclosure, the input unit 120 may receive a selection list to be copied among the list of attributes displayed on the display unit 110 from the user.

Referring to FIG. 9, the display unit 110 may further display thereon a list of attributes in which selected attributes previously applied to the target object 510 have been accumulated. Accordingly, the control unit 130 may further include a separate database for storing a list of previously applied selected attributes. The list of attributes may be displayed in the order of, for example, a form attribute, a type attribute, a dynamic attribute, and a character attribute.

The list of attributes may be configured in the form of check boxes. The check boxes may be displayed corresponding to the list of the selected attributes. The user may enter a selection list to be copied to the target object 510 among the list of attributes by clicking the mouse on the check box. Then, when the user enters the target object 510, the control unit 130 may apply the selected attributes represented in the input selection list to the target object 510. As described above, the user may apply the selected attributes that were previously applied to the target object 510 to another object 510, to manage the edited object integrally. As a result, the object can be simply and efficiently edited.

According to an exemplary embodiment of the present disclosure, the control unit 130 may control the display unit 110 so that it displays a list of attributes according to selected attributes represented in the list of attributes. In other words, each item included in the list of attributes may be displayed according to selected attributes listed in the list.

Referring to FIG. 10, each of the items included in the list of attributes may correspond to the respective items in the list shown in FIG. 9. Accordingly, the control unit 130 may control so that the form attributes of the rectangle and shading of FIG. 9 are represented as a single image of the shaded rectangle of FIG. 10. Accordingly, the control unit 130 may control so that the form attributes of the rectangle and the dynamic attribute of blinking of FIG. 9 are represented as an image of a triangle blinking at a regular interval in FIG. 10. In addition, the control unit 130 may control so that the form attributes of the circle of FIG. 9 is represented as an image of a circle in FIG. 10. In addition, the character attributes of FIG. 9 may be represented as images or texts of the items with the font or the size in FIG. 10.

Although not shown in the drawings, the control unit 140 may control the display unit 110 so that it displays the images or texts of the list of attributes according to the form attributes of the color of the object. For example, if a form attribute of yellow is included in the selected attributes, images or texts of the list of attributes representing it may be displayed in yellow.

Figure 11:
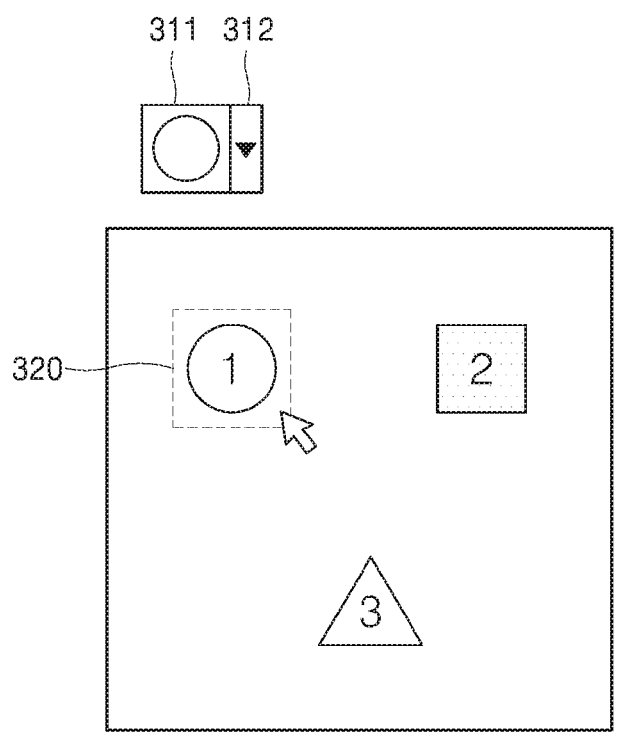

FIGS. 11 and 12 are diagrams showing the copy icon 311 displayed depending on selected attributes according to an exemplary embodiment of the present disclosure. Hereinafter, the copy icon 311 will be described in detail with reference to FIGS. 11 and 12.

As described above, according to an exemplary embodiment of the present disclosure, the display unit 110 may display the copy icon 311, and the input unit 120 may receive a selected attribute from a user via the copy icon 311. The control unit 130 may control the display unit 110 so that the copy icon 311 is displayed according to the selected attribute input from the user.

Referring to FIG. 11, the user may drag around the object #1 so that it is included in the area 320, and may enter the form attribute of the circle among the object attributes of the object #1 as the select attribute. The control unit 130 may control the display unit 110 so that it displays an image of a circle in the copy icon 311 according to the selected attribute input from the user.

In addition, referring to FIG. 12, the user may drag around the object #2 so that it is included in the area 320, and may enter the form attribute of the rectangle and shading among the object attributes of the object #2 as the selected attributes. The control unit 130 may control the display unit 110 so that it displays an image of the shaded rectangle in the copy icon 311 according to the selected attributes input from the user.

In addition, although not shown in the drawings, the control unit 130 may control the display unit 110 so that it displays the copy icon 311 according to the form attributes of the color of the object. For example, if a form attribute of blue is included in the selected attributes, the copy icon 311 representing it may be displayed in blue.

As described above, according to the exemplary embodiments of the present disclosure, the list of the attributes and the copy icon are graphically displayed according to the selected attributes, the user can intuitively recognize the selected attributes to be applied to the target object 510.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. An apparatus for editing object attributes of a Human Machine Interface (HMI) object in a power system, the apparatus comprising:
   a display unit configured to display a plurality of objects;
   an input unit configured to receive two or more selected objects among the plurality of objects, having selected attributes to be copied and a target object to which the selected attributes are to be applied; and
   a control unit configured to apply the selected attributes to the target object according to a predetermined application sequence when a same kind of the selected objects are received and control the display unit so that the selected attributes are applied to the target object and the target object with the selected attributes applied thereto is displayed,
   wherein the predetermined application sequence is a predetermined criterion that determines which one of the selected attributes is applied to the target object first.

2. The apparatus of claim 1, wherein the input unit comprises a copy unit configured to copy the attributes; and a selection unit configured to select the target object.

3. The apparatus of claim 2, wherein the control unit is configured to apply the copied selected attributes to the target object when the target object is selected by the selection unit.

4. The apparatus of claim 2, wherein the control unit is configured to cancel the copy of the selected attributes when the selection of the target object is released.

5. The apparatus of claim 1, wherein the object attributes comprise at least one of a form attribute, a type attribute, a dynamic attribute, and a character attribute.

6. The apparatus of claim 1, wherein the control unit is configured to control the display unit so that it further displays a list of attributes representing selected attributes applied to the target object.

7. The apparatus of claim 6, wherein the input unit is configured to receive a selection list to be copied among the list of attributes displayed on the display unit from the user, and
   wherein the control unit is configured to apply the selected attributes represented in the selection list input from the user to the target object.

8. The apparatus of claim 6, wherein the control unit is configured to control the display unit so that it further displays the list of attributes according to the selected attributes represented in the list of the attributes.

9. The apparatus of claim 1, wherein the display unit is configured to further display a copy icon,
   wherein the input unit is configured to receive the selected attributes from the user via the copy icon, and
   wherein the control unit is configured to control the display unit so that it displays the copy icon according to the selected attributes input from the user.

* * * * *